United States Patent [19]
Hewton

[11] Patent Number: 5,889,915
[45] Date of Patent: Mar. 30, 1999

[54] DIGITAL STORAGE DEVICE FOR A TELEVISION

[76] Inventor: Alfred F. Hewton, 5420 N. Morgan St. #304, Alexandria, Va. 22312

[21] Appl. No.: 910,520

[22] Filed: Aug. 7, 1997

[51] Int. Cl.[6] ............... H04N 5/91; H04N 7/00
[52] U.S. Cl. ............... 386/46; 386/34; 386/52; 348/705; 348/722
[58] Field of Search .................. 386/34, 52, 54, 386/99, 64, 39–40, 46, 96, 104; 348/552–553, 559–560, 705–706, 719, 722, 734; H04N 5/91, 7/00

[56] References Cited

U.S. PATENT DOCUMENTS

| | | | |
|---|---|---|---|
| 4,488,179 | 12/1984 | Kruger et al. | 358/181 |
| 4,963,995 | 10/1990 | Lang | 358/335 |
| 5,083,212 | 1/1992 | Owa et al. | 358/319 |
| 5,121,476 | 6/1992 | Yee | 395/154 |
| 5,142,375 | 8/1992 | Fukuda et al. | 358/310 |
| 5,153,726 | 10/1992 | Billing | 358/160 |
| 5,319,501 | 6/1994 | Mitsuhashi | 360/19.1 |
| 5,359,365 | 10/1994 | Enokida | 348/390 |
| 5,430,579 | 7/1995 | Onishi et al. | 360/9.1 |
| 5,555,097 | 9/1996 | Joung et al. | 358/335 |
| 5,565,929 | 10/1996 | Tanaka | 348/565 |
| 5,798,800 | 8/1998 | Nonaka | 348/705 |

*Primary Examiner*—Wendy Garber
*Assistant Examiner*—Vincent F. Boccio

[57] ABSTRACT

A new DIGITAL STORAGE DEVICE FOR A TELEVISION for providing a convenient method of storing, playing back and deleting various signals from a television with a digital storage mechanism. The inventive device includes a television with a digital storage mechanism situated therein which is adapted to tag each continues storage of video and audio signals, or program, in data memory with a unique number for identification purposes.

5 Claims, 3 Drawing Sheets

DIGITAL STORAGE DEVICE FOR A TELEVISION

BACKGROUND OF THE INVENTION

1. Field of the Invention

The present invention relates to video cassette recorders and more particularly pertains to a new DIGITAL STORAGE DEVICE FOR A TELEVISION for providing a convenient method of storing, playing back and deleting various signals received from a television.

2. Description of the Prior Art

The use of video cassette recorders is known in the prior art. More specifically, video cassette recorders heretofore devised and utilized are known to consist basically of familiar, expected and obvious structural configurations, notwithstanding the myriad of designs encompassed by the crowded prior art which have been developed for the fulfillment of countless objectives and requirements.

Known prior art video cassette recorders include U.S. Pat. No. 5,121,476; U.S. Pat. No. 5,083,212; U.S. Pat. No. 5,153,726; U.S. Pat. No. 5,319,501; U.S. Pat. No. 5,430,579; and U.S. Pat. No. Design 357,244.

In these respects, the DIGITAL STORAGE DEVICE FOR A TELEVISION according to the present invention substantially departs from the conventional concepts and designs of the prior art, and in so doing provides an apparatus primarily developed for the purpose of providing a convenient method of storing, playing back and deleting various signals received from a television.

SUMMARY OF THE INVENTION

In view of the foregoing disadvantages inherent in the known types of video cassette recorders now present in the prior art, the present invention provides a new DIGITAL STORAGE DEVICE FOR A TELEVISION construction wherein the same can be utilized for providing a convenient method of storing, playing back and deleting various signals received from a television.

The general purpose of the present invention, which will be described subsequently in greater detail, is to provide a new DIGITAL STORAGE DEVICE FOR A TELEVISION apparatus and method which has many of the advantages of the video cassette recorders mentioned heretofore and many novel features that result in a new DIGITAL STORAGE DEVICE FOR A TELEVISION which is not anticipated, rendered obvious, suggested, or even implied by any of the prior art video cassette recorders, either alone or in any combination thereof.

To attain this, the present invention generally comprises a television having a screen and at least one speaker. In use, the television is adapted for transmitting therefrom audio signals and video signals received either by way of an antenna or a coaxial cable. Next provided is a digital storage mechanism positioned within the television. In the alternative, the digital storage mechanism may be a stand alone unit equipped with a display. Note FIG. 4. Both embodiments include an interface logic bus having a plurality of data inputs, a plurality of data outputs, and a plurality of control inputs and outputs. Note FIG. 3. Such control inputs and outputs are adapted for allowing the selective transmission of signals from the data inputs to the data outputs thereof as a function of signals received via the control inputs. An audio input line and a video input line are connected between the interface logic bus and the television for receiving audio signals and video signals from the television. Associated therewith is an audio output line and a video output line connected between the interface logic bus and the television. The output lines serve to transmit audio signals and video signals to the television. Connected between each output line and the interface logic bus and further between each input line and the interface logic bus is a low pass filter. Also included is an analog to digital converter connected between each input line and the interface logic bus. Such converters are included for converting the signals received from the television from an analog to digital form. A digital to analog converter is connected between each output line and the interface logic bus for converting the signals transmitted to the television from a digital to analog form. For controlling a rate at which the converters sample the signals passing therethrough, an oscillator is connected thereto. Further provided is a data memory connected to the interface logic bus for receiving signals therefrom and storing the same. The data memory is further adapted for transmitting signals to the interface logic bus. A control logic bus is connected to the control inputs and outputs of the interface logic bus for allowing the transfer of control signals to and from the interface logic bus. Connected to the control logic bus is a real time clock for continuously transmitting thereto a current time. With continuing reference to FIG. 3, it is shown that control memory is connected to the control logic bus. Such control memory functions to store a plurality of control signals. Each control signal is adapted effect a unique transfer of signals between the inputs and outputs of the interface logic bus. For transmitting the control signals from the control memory to the interface logic bus to effect various operations, a microprocessor is connected to the control logic bus. For reasons that will become apparent hereinafter, the microprocessor is adapted to tag each continues storage of video and audio signals in the data memory with a unique identification number. As shown in FIG. 5, a manual control unit is provided. The control unit is in communication with the microprocessor preferably by means of an infrared transmitter and receiver. The manual control unit is included for allowing a user to select a presently executed operation. To accomplish such, the manual control unit includes a program button, a record memory button, an enter button, a plurality of numeric buttons, and a delete button.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new DIGITAL STORAGE DEVICE FOR A TELEVISION apparatus and method which has many of the advantages of the video cassette recorders mentioned heretofore and many novel features that result in a new DIGITAL STORAGE DEVICE FOR A TELEVISION which is not anticipated, rendered obvious, suggested, or even implied by any of the prior art video cassette recorders, either alone or in any combination thereof.

It is another object of the present invention to provide a new DIGITAL STORAGE DEVICE FOR A TELEVISION which may be easily and efficiently manufactured and marketed.

It is a further object of the present invention to provide a new DIGITAL STORAGE DEVICE FOR A TELEVISION which is of a durable and reliable construction.

An even further object of the present invention is to provide a new DIGITAL STORAGE DEVICE FOR A TELEVISION which is susceptible of a low cost of manufacture with regard to both materials and labor, and which accordingly is then susceptible of low prices of sale to the consuming public, thereby making such DIGITAL STORAGE DEVICE FOR A TELEVISION economically available to the buying public.

Still yet another object of the present invention is to provide a new DIGITAL STORAGE DEVICE FOR A TELEVISION which provides in the apparatuses and methods of the prior art some of the advantages thereof, while simultaneously overcoming some of the disadvantages normally associated therewith.

Still another object of the present invention is to provide a new DIGITAL STORAGE DEVICE FOR A TELEVISION for providing a convenient method of storing, playing back and deleting various signals received from a television on a digital storage mechanism.

Even still another object of the present invention is to provide a new DIGITAL STORAGE DEVICE FOR A TELEVISION that includes a television with a digital storage mechanism situated therein which is adapted to tag each continues storage of video and audio signals, or program, in data memory with a unique number for identification purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
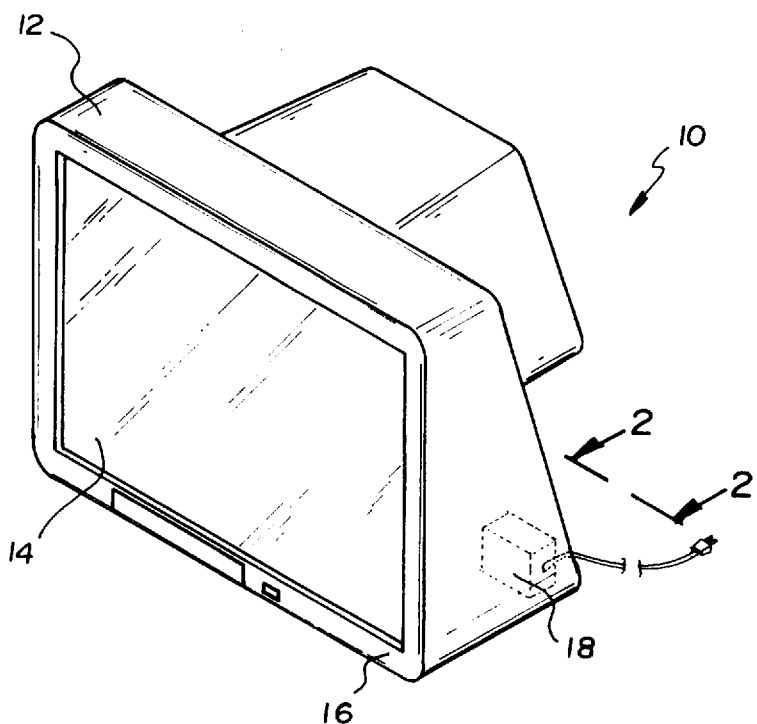
FIG. 1 is a perspective view of a new DIGITAL STORAGE DEVICE FOR A TELEVISION according to the present invention.
Figure 2:
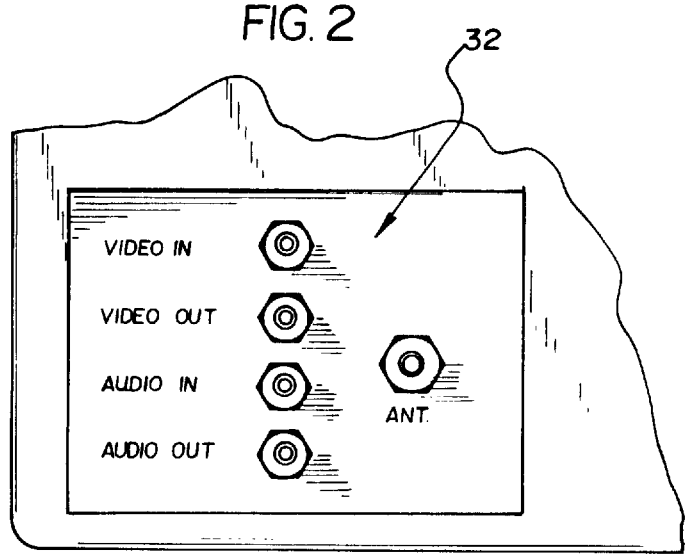
FIG. 2 is a rear view of the embodiment of the present invention shown in FIG. 1.

With reference now to the drawings, and in particular to FIGS. 1 through 5 thereof, a new DIGITAL STORAGE DEVICE FOR A TELEVISION embodying the principles and concepts of the present invention and generally designated by the reference numeral 10 will be described.

The system 10 of the present in invention includes a television 12 having a screen 14 and at least one speaker 16. In use, the television is adapted for transmitting therefrom audio signals and video signals received either by way of an antenna or a coaxial cable.

Next provided is a digital storage mechanism 18 positioned within the television. In the alternative, the digital storage mechanism may be a stand alone unit 20 equipped with a separate display. Note FIG. 4.

Both embodiments include an interface logic bus 22 having a plurality of data inputs, a plurality of data outputs, and a plurality of control inputs and outputs. Note FIG. 3. Such control inputs are adapted for allowing the selective transmission of signals from the data inputs to the data outputs thereof as a function of various control signals.

An audio input line 24 and a video input line 26 are connected between the interface logic bus and the television for receiving audio signals and video signals from the television. Associated therewith is an audio output line 28 and a video output line 30 connected between the interface logic bus and the television. The output lines serve to transmit audio signals and video signals to the television. It should be noted that in the preferred embodiment, such input and output lines are further connected to a plurality of corresponding jacks 32 situated on a rear of the television. Note FIG. 2. This allows for the use of the present embodiment with a VCR.

Connected between each output line and the interface logic bus and further between each input line and the interface logic bus is a low pass filter 34. Each low pass filter is included to ensure that the Nyquist Criterion is met. In other words, the low pass filter should have a 3 dB point at 4.2 Mhz.

Also included is an analog to digital converter 36 connected between each input line and the interface logic bus. Such converters are included for converting the signals received from the television from an analog to digital form. A digital to analog converter 38 is connected between each output line and the interface logic bus for converting the signals transmitted to the television from a digital to analog form. For controlling a rate at which the converters sample the signals passing therethrough, an oscillator is connected thereto. In the preferred embodiment, the sampling frequency is twice the 4.2 Mhz associated with the low pass filter.

Further provided is data memory 44 connected to the interface logic bus for receiving signals therefrom and storing the same. The data memory is further adapted for transmitting such stored signals to the interface logic bus. Preferably, such data memory has a large capacity which is capable of storing up to 10 television programs.

A control logic bus 46 is connected to the control inputs and outputs of the interface logic bus for allowing the transfer of control signals to and from the interface logic bus. Connected to the control logic bus is a real time clock 48 for continuously transmitting thereto a current time. It should be understood that such time has associated therewith a current date.

Figure 3:
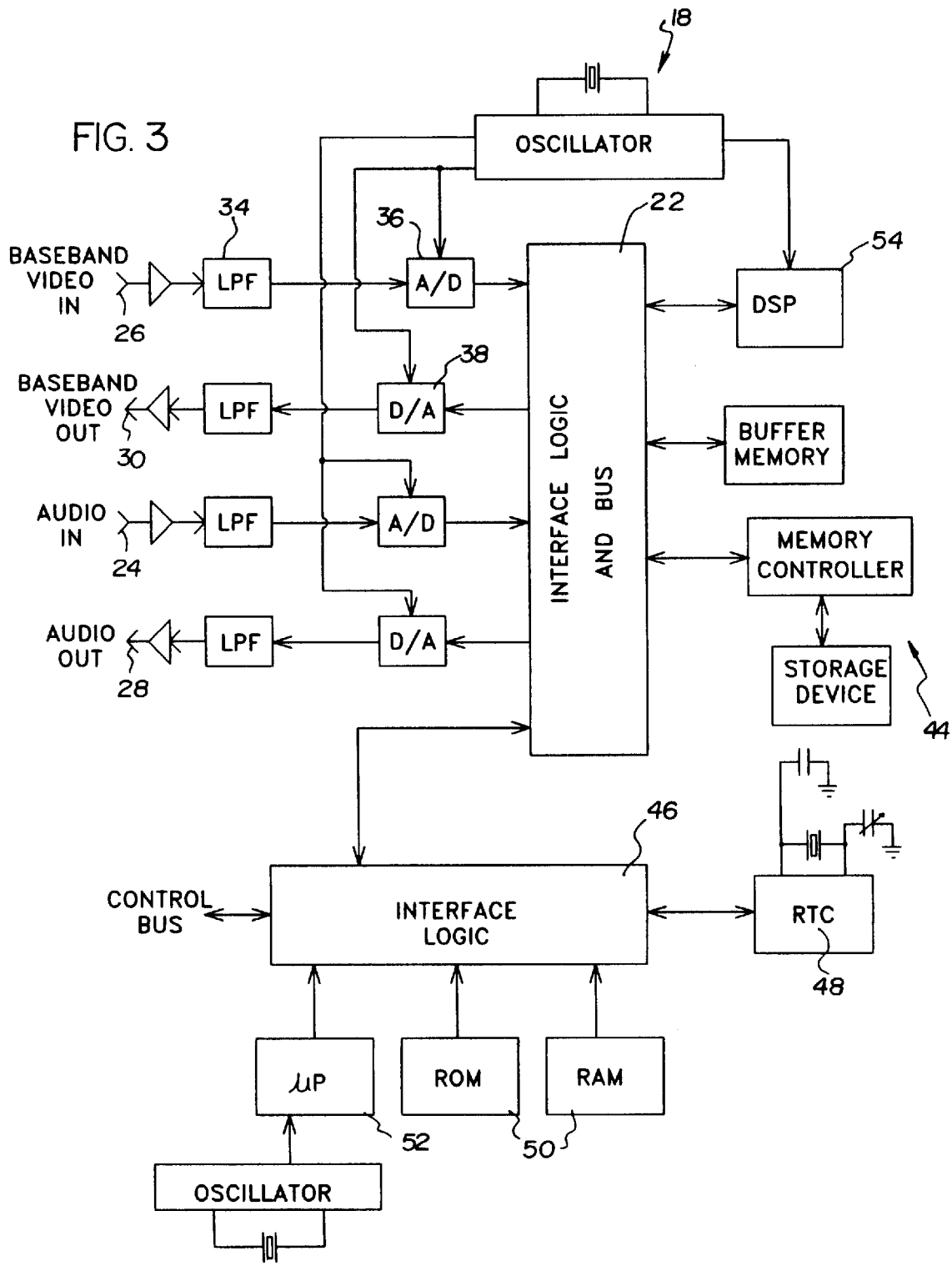
FIG. 3 is a schematic diagram of the present invention.
Figure 4:
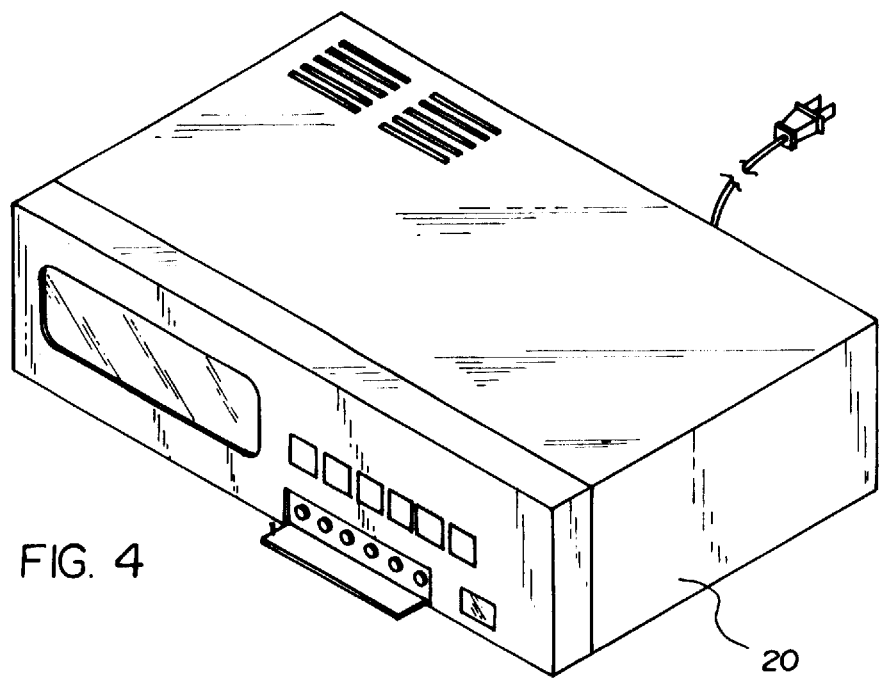
FIG. 4 is a perspective view of an alternate embodiment of the present invention.

With continuing reference to FIG. 3, it is shown that control memory 50 is connected to the control logic bus. Such control memory functions to store a plurality of control signals. Each control signal is adapted effect a unique transfer of signals between the inputs and outputs of the interface logic bus thereby implementing a unique function. Such functions will be described in greater detail hereinafter.

For transmitting the control signals from the control memory to the interface logic bus to effect various operations, a microprocessor 52 is connected to the control logic bus. The microprocessor is adapted to initialize and control the various components of the digital storage mechanism. For reasons that will become apparent hereinafter, the microprocessor is adapted to tag each continuous storage of video and audio signals in the data memory with a unique identification number. Each successive program that is stored is assigned a number greater than that assigned to a previously recorded program.

Further under the control of the microprocessor is a digital signal processor 54 which is in turn connected to the interface logic bus. Such processor is included for implementing real-time video data compression. This is imperative for conserving storage capacity in the data memory.

Figure 5:
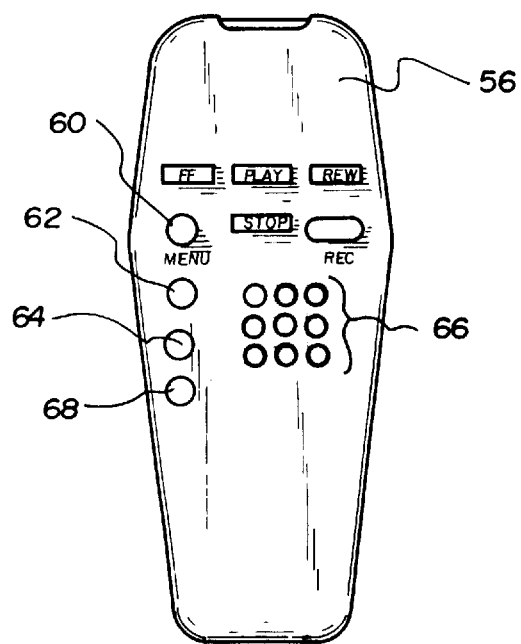
FIG. 5 is a top view of the manual control unit of the present invention.

As shown in FIG. 5, a manual control unit 56 is provided. The control unit is in communication with the microprocessor preferably by means of an infrared transmitter and receiver. The manual control unit is included for allowing a user to select a presently executed operation. To accomplish such, the manual control unit includes a program button 60, a record memory button 62, an enter button 64, a plurality of numeric buttons 66, and a delete button 68.

The method associated with the present invention will now be set forth. Such method first includes a procedure of recording signals received via the television as a function of time. This procedure including the steps of: pressing the program button, pressing the record memory button for displaying a menu, entering via the numeric buttons a time, date and channel at which recording is desired, and pressing enter.

The procedure for playing back stored signals received via the television includes the steps of: pressing the program button, pressing the record memory button twice for displaying signals recorded with the associated numeric tag, entering via the numeric buttons a numeral corresponding with the numeric tag associated with the signals desired to be played back, and pressing the enter button.

Finally, a method of deleting stored signals received via the television includes the steps of: pressing the program button, pressing the record memory button twice for displaying signals recorded with associated numeric tag, entering via the numeric buttons a numeral corresponding with the numeric tag associated with the signals desired to be played back, and pressing the delete button. In the alternative, the record memory button may be continuously depressed to scroll and highlight various programs listed on the screen of the television. Upon the depression of the delete button, the highlighted program, or stored signals, are deleted.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An inboard digital storage device comprising, in combination:

a television having a screen and at least one speaker for transmitting therefrom received audio signals and video signals;

a digital storage mechanism positioned within the television and comprising:

an interface logic bus having a plurality of data inputs, a plurality of data outputs, and a plurality of control inputs and outputs for allowing the selective transmission of signals from the data inputs to the data outputs thereof as a function of signals received via the control inputs, an audio input line and a video input line connected between the interface logic bus and the television for receiving audio signals and video signals from the television, an audio output line and a video output line connected between the interface logic bus and the television for transmitting audio signals and video signals to the television, a low pass filter connected between each output line and the interface logic bus and further between each input line and the interface logic bus, an analog to digital converter connected between each input line and the interface logic bus for converting the signals received from the television from an analog to digital form, a digital to analog converter connected between each output line and the interface logic bus for converting the signals transmitted to the television from a digital to analog form, an oscillator connected to the converters for controlling a rate at which the converters sample the signals passing therethrough, data memory connected to the interface logic bus for receiving signals therefrom and storing the same and further transmitting signals to the interface logic bus, a control logic bus connected to the control inputs and outputs of the interface logic bus for allowing the transfer of control signals to and from the interface logic bus, a real time clock connected to the control logic bus for continuously transmitting thereto a current time, control memory connected to the control logic bus for storing a plurality of control signals which each effect a unique transfer of signals between the inputs and outputs of the interface logic bus, and a microprocessor connected to the control logic bus for transmitting the control signals from the control memory to the interface logic bus to effect various operations, the microprocessor tagging each continues storage of video and audio signals in the data memory with a unique number for identification purposes;

a manual control unit in communication with the microprocessor for allowing a user to select a presently executed operation, the operations including the storage of video and audio signals in the data memory as a function of the current time, transmitting to the television video and audio signals stored in the data memory, and deleting video and audio signals stored in the data memory; wherein a digital signal processor is connected to the interface bus and operates under control of the microprocessor.

2. A digital storage device for a television comprising:

a television having a screen and at least one speaker for transmitting therefrom received audio signals and video signals;

a digital storage mechanism comprising:
  an interface logic bus having a plurality of data inputs, a plurality of data outputs, and a plurality of control inputs and outputs for allowing the selective transmission of signals from the data inputs to the data outputs thereof as a function of signals received via the control inputs, an audio input line and a video input line connected between the interface logic bus and the television for receiving audio signals and video signals from the television, an audio output line and a video output line connected between the interface logic bus and the television for transmitting audio signals and video signals to the television, a low pass filter connected between each output line and the interface logic bus and further between each input line and the interface logic bus, an analog to digital converter connected between each input line and the interface logic bus for converting the signals received from the television from an analog to digital form, a digital to analog converter connected between each output line and the interface logic bus for converting the signals transmitted to the television from a digital to analog form, an oscillator connected to the converters for controlling a rate at which the converters sample the signals passing therethrough, data memory connected to the interface logic bus for receiving signals therefrom and storing the same and further transmitting signals to the interface logic bus, a control logic bus connected to the control inputs and outputs of the interface logic bus for allowing the transfer of control signals to and from the interface logic bus, a real time clock connected to the control logic bus for continuously transmitting thereto a current time, control memory connected to the control logic bus for storing a plurality of control signals which each effect a unique transfer of signals between the inputs and outputs of the interface logic bus, and a microprocessor connected to the control logic bus for transmitting the control signals from the control memory to the interface logic bus to effect various operations, the microprocessor tagging each continues storage of video and audio signals in the data memory with a unique number for identification purposes;

a manual control unit in communication with the microprocessor for allowing a user to select a presently executed operation, the operations including the storage of video and audio signals in the data memory as a function of the current time, transmitting to the television video and audio signals stored in the data memory, and deleting video and audio signals stored in the data memory; wherein a digital signal processor is connected to the interface bus and operates under control of the microprocessor.

3. A digital storage device for a television as set forth in claim 2 wherein the digital storage mechanism is situated within the television.

4. A digital storage device for a television as set forth in claim 2 wherein the digital storage mechanism is a stand alone unit.

5. A method associated with the use of an inboard digital storage device including the steps of:

providing a television having a screen and at least one speaker for transmitting therefrom received audio signals and video signals;

providing a digital storage mechanism positioned within the television and comprising:
  an interface logic bus having a plurality of data inputs, a plurality of data outputs, and a plurality of control inputs and outputs for allowing the selective transmission of signals from the data inputs to the data outputs thereof as a function of signals received via the control inputs, an audio input line and a video input line connected between the interface logic bus and the television for receiving audio signals and video signals from the television, an audio output line and a video output line connected between the interface logic bus and the television for transmitting audio signals and video signals to the television, a low pass filter connected between each output line and the interface logic bus and further between each input line and the interface logic bus, an analog to digital converter connected between each input line and the interface logic bus for converting the signals received from the television from an analog to digital form, a digital to analog converter connected between each output line and the interface logic bus for converting the signals transmitted to the television from a digital to analog form, an oscillator connected to the converters for controlling a rate at which the converters sample the signals passing therethrough, data memory connected to the interface logic bus for receiving signals therefrom and storing the same and further transmitting signals to the interface logic bus, a control logic bus connected to the control inputs and outputs of the interface logic bus for allowing the transfer of control signals to and from the interface logic bus, a real time clock connected to the control logic bus for continuously transmitting thereto a current time, control memory connected to the control logic bus for storing a plurality of control signals which each effect a unique transfer of signals between the inputs and outputs of the interface logic bus, and a microprocessor connected to the control logic bus for transmitting the control signals from the control memory to the interface logic bus to effect various operations, the microprocessor tagging each continuos storage of video and audio signals in the data memory with a unique number for identification purposes; a digital signal processor is connected to the interface bus and operates under control of the microprocessor;

providing a manual control unit in communication with the microprocessor for allowing a user to select a presently executed operation, the manual control unit including a program button, a record memory button, an enter button, a plurality of numeric buttons, and a delete button;

providing a method of recording signals received via the television as a function of time including the steps of:

pressing the program button, pressing the record memory button for displaying a menu, entering via the numeric buttons a time and channel at which recording is desired, and pressing enter;

providing a method of playing back stored signals received via the television including the steps of:

pressing the program button, pressing the record memory button twice for displaying signals recorded with associated numeric tag, entering via the numeric buttons a numeral corresponding with the numeric tag associated with the signals desired to be played back, and pressing the enter button; and providing a method of deleting stored signals received via the television including the steps of:

pressing the program button, pressing the record memory button twice for displaying signals recorded with associated numeric tag, entering via the numeric buttons a numeral corresponding with the numeric tag associated with the signals desired to be played back, and pressing the delete button.

\* \* \* \* \*